O. H. SPENCER.
POSITIONER FOR SILENT CHAIN LINKS.
APPLICATION FILED APR. 24, 1916.
1,256,943.
Patented Feb. 19, 1918.
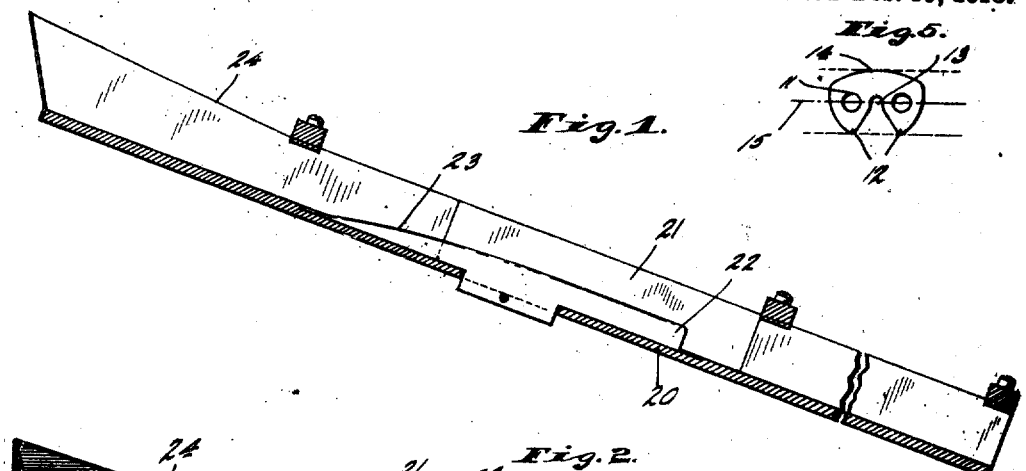
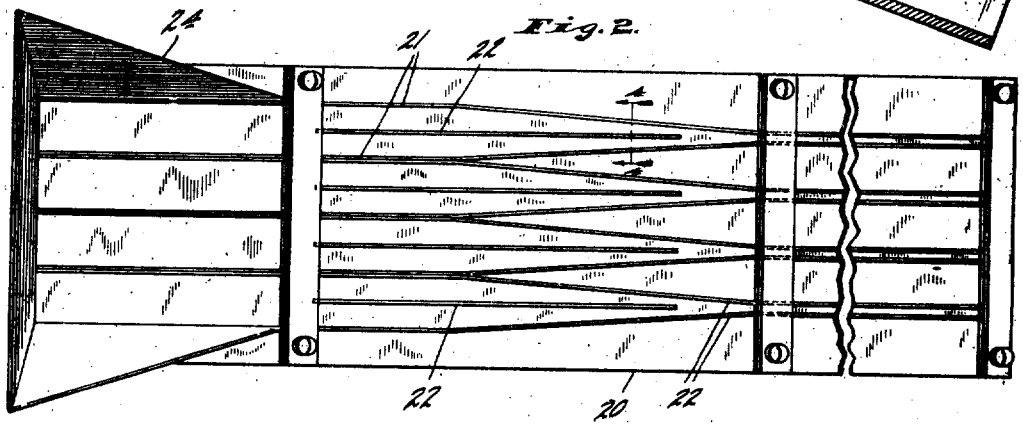
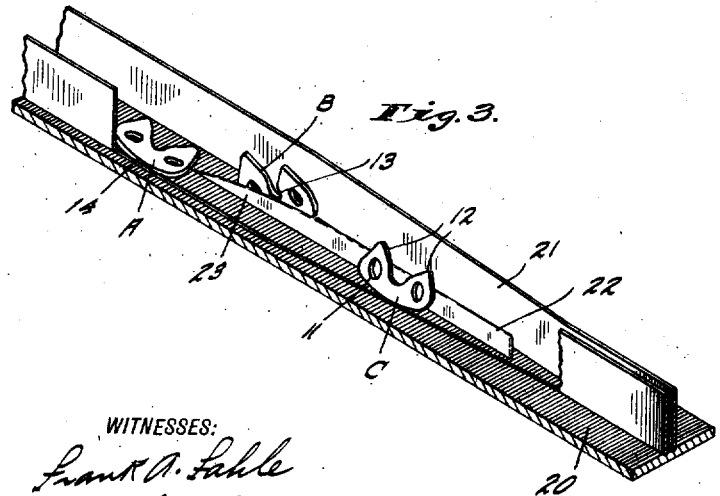
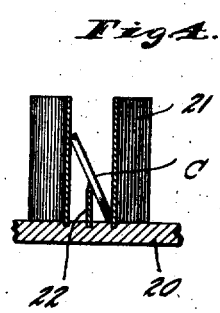
WITNESSES:
Frank A. Fahle
Josephine Gasper
INVENTOR
Owen K. Spencer,
BY
Hood & Schley
ATTORNEYS

UNITED STATES PATENT OFFICE.

OWEN H. SPENCER, OF INDIANAPOLIS, INDIANA, ASSIGNOR TO LINK-BELT COMPANY, OF CHICAGO, ILLINOIS, A CORPORATION OF ILLINOIS.

POSITIONER FOR SILENT-CHAIN LINKS.

1,256,943.      Specification of Letters Patent.      Patented Feb. 19, 1918.

Application filed April 24, 1916. Serial No. 93,323.

*To all whom it may concern:*

Be it known that I, OWEN H. SPENCER, a citizen of the United States, residing at Indianapolis, in the county of Marion and State of Indiana, have invented a new and useful Positioner for Silent-Chain Links, of which the following is a specification.

In the manufacture of silent chains, it is necessary that the links be operated on individually a number of times in order to produce the finished chain. Heretofore, it has been necessary in practice to place the individual links in position by hand, for each operation, involving great labor and expense, as the links are manufactured and handled by the million.

It is the object of my present invention to bring to a definite position and arrangement silent chain links which are in a haphazard mass, so that after such links are brought to such definite position and arrangement they may be conveyed in suitable position and arrangement to the machine which is next to operate on them. The present invention deals solely with the initial positioning and arranging mechanism; and serves to bring the links of the haphazard mass all to the same position with the links arranged end to end. The links may be fed in this initial arrangement from the positioning device forming the subject-matter of the present application to certain machines for treating the links, usually individually; or may be fed to other devices, such as that shown in the co-pending application of Henry E. Hayward, Ser. No. 93,321 or that shown in my co-pending application Ser. No. 93,322, both of even filing date herewith, which transform this initial link arrangement, with the links arranged all in the same position end to end, to a second arrangement or stack of links, with the links arranged side by side with their points registering, which second arrangement is found to be a most convenient and suitable one for transporting the links from one place to another, as on the slide rail forming the subject-matter of the co-pending application of Frank J. Oakes, Ser. No. 93,326, also of even filing date herewith, and for handling the links in other machines which may operate on them, either individually or in the assembling of the complete chain, as for instance those shown in the co-pending joint application of Frank J. Oakes and myself, Ser. Nos. 93,324 and 93,325, also of even filing date herewith. The various inventions covered by these several applications may be used together in different arrangements in the manufacture of silent chains.

My present invention is a further development of the invention set forth in a co-pending application of Henry E. Hayward, Ser. No. 93,320, of even filing date herewith.

The accompanying drawing illustrates my invention. Figure 1 is a longitudinal section through a positioning and arranging device embodying my invention; Fig. 2 is a plan of such positioning and arranging device; Fig. 3 is a partial perspective view of one of the unitary positioning and arranging devices, with one of the walls broken away to show the action of the device; Fig. 4 is a section on the line 4—4 of Fig. 2; and Fig. 5 is an elevation of a silent chain link with its points downward.

My positioning device operates by gravity. Silent chain links are usually punchings of sheet metal, of greater general length than width, symmetrical about the transverse medial line but unsymmetrical both in form and weight about the longitudinal medial line. By reason of this unsymmetricality, the center of gravity of the link is to one side of this longitudinal medial line. In consequence, if the link is lifted by a narrow support extending along this longitudinal medial line, the center of gravity of the link is on one side of such medial support, and the part of the link on that side will tip downward so that the part on the other side tips upward.

This is illustrated by the silent chain link shown in Fig. 5. The longitudinal or horizontal dimension of the link is greater than its transverse or vertical dimension. The two ends of the link are alike, each end being provided with a hole 11 of any suitable shape for receiving a pivot pin. At its lower edge the link is provided with two points 12, between which is a crotch 13. The top or back 14 of the link is usually curved, and usually is not cut out by a crotch. In consequence, because the crotch 13 projects in from one edge and no similar crotch projects in from the other, the back portion of the link, or the portion above the longitudinal medial line 15 in Fig. 5, is heavier than the point or lower edge of the link;

or in other words the center of gravity of the link is above such longitudinal medial line 15 in the link shown.

My positioning device is conveniently made in multiple, so that it can act on a number of links at the same time. It comprises a base 20, sheet metal strips 21 projecting from the upper face of the base and substantially perpendicular thereto, so as to form troughs, which flare laterally at an intermediate point so as to be wider at one end than at the other, and strips 22 also projecting from the upper face of the base and substantially perpendicular thereto. The strips 22 are located between the strips 21 of the trough at the place where such latter strips flare to widen the trough, and are shown as of less height than the strips 21. The base 20 is usually inclined, so that gravity will slide the links along its upper surface. Two sheet metal strips 21 and the strip 22 between them, coöperating with the base 21 below, constitute a unitary positioning means, which may be duplicated in the apparatus to as great an extent as desired; Fig. 2 shows four of these unitary positioning means. The strips 21 extend the full length of the base 20; but the strips 22 are relatively short, and reach to neither end of the base 20. That end of each strip 22 which is toward the wide end of the troughs is cut away obliquely to form a plow point 23, so that the extreme point of such upper edge comes flush with or below the upper surface of the base 20, as clear from Figs. 1 and 3. The two strips 21 of each unitary positioning means are spaced apart beyond the end of the plow point 23 by a distance just greater than the width—or vertical dimension in Fig. 5—of the link, so that they will receive between them with just sufficient clearance to prevent binding a link lying flat on the base 20 and having its longitudinal dimension extending along the trough formed by strips 21, as shown by the link A in Fig. 3. The width of this trough is not great enough to receive links with their longitudinal dimension transverse to the trough. The several troughs formed by the several unitary positioning means touch one another at their wider parts, or at the left-hand end of Fig. 2, by reason of the coming together of the strips 21 of adjacent unitary positioning means at such end; and a flaring-sided hopper 24 is provided at this end and partly along the two sides of the complete device, so that links can be thrown haphazard into such hopper and will drop into the troughs formed by the strips 21. These links will fall into these troughs and position themselves by gravity flatwise of the troughs with their longitudinal dimensions lengthwise thereof, as illustrated by the link A in Fig. 3. The points 12 of the links may be toward either side of the trough, depending wholly on chance. At the plow point 23 and strip 22, the two strips 21 of each unitary positioning means converge toward each other; and in the arrangement shown the strip 22 is lower than are the strips 21 and lower than the width—or vertical dimension in Fig. 5—of the link. At the end of the strip 22 opposite the plow point 23, the strips 21 are sufficiently close together so that they will receive between them a link lying on its back and somewhat tilted from a vertical plane, the tilting being sufficiently slight so that as the sides 21 continue to converge, as they do, the link will without binding be brought upright substantially to a vertical plane. The strips 21 continue to converge until they provide between them just sufficient space to receive a link edgewise, with sufficient clearance for sliding.

In operation, the links are thrown haphazard into the hopper 24 in any suitable way, and fall into the troughs provided by the strips 21 and take a flatwise position in the bottom of such troughs, as shown by the link A in Fig. 3. These links are slid along these troughs in any manner, as by gravity if the troughs are inclined. As they slide, they come against the plow points 23, and slide up on the edges of such plow points, which extend along the longitudinal medial lines 15 of the links. The center of gravity of each link as it slides along the plow point 23 is on the opposite side of such plow point from the link points 12, so that the back 14 of the link remains down against the upper surface of the base 20 and the points 12 are tilted up, as illustrated by the link B in Fig. 3, such link B being shown as at an intermediate point along the plow point. As the link continues to slide along the base 20, and to be tilted by the plow point 23 and strip 22, it passes into the region where the strips 21 converge, and the up-tilted link points 12 are engaged by the strip 21, before the link reaches the lower end of the strip 22 if such strip is of less height than the width of the link, as illustrated by the link C. Even if the strip 22 is higher, such engagement preferably takes place before the link has passed fully out of engagement with the strip 22, and in either case when the link is up-tilted to at least such an angle, as clear from Fig. 4, that it will not bind between the converging strips 21, but will be further up-tilted by such converging walls after the link has passed beyond the end of the strip 22, until the link lies substantially in a vertical plane. The strips 21 come sufficiently close together so as to permit sliding of the links in this edgewise position without binding while preventing overlapping of the links. The narrow troughs formed by the strips 21 after they have converged may be extended for any desired distance, so as to provide storage capacity so that the links may be held in an edgewise position end to end without overlapping. In these narrow troughs the links are supported edgewise, and all the links have their points upward. These narrow troughs may be curved and twisted as desired, and the links will slide along them, by gravity if the slope be sufficient.

I claim as my invention:

1. A positioning device for silent chain links, comprising a trough of proper width at one end to allow a silent chain link to lie longitudinally flatwise therein but to prevent it from lying crosswise therein, so that the points of the link are necessarily toward one side or the other of the trough, and converging at an intermediate point toward the other end so that at such other end the width is merely sufficient to receive the links edgewise with sufficient clearance for sliding, and a medial longitudinal vertical partition located in said trough at its converging portion, said partition terminating toward the wide end of the trough in a narrow plow point formed by having its upper edge extend at an oblique angle to the bottom of the trough to the plane of the under surface of a link lying in the trough so that as a link slides along the trough said plow point projects under it along its longitudinal medial line and tilts one edge of the link upward to bring the link toward an upright position on the other side of said partition from that on which said edge originally lay.

2. A positioning device for silent chain links, comprising a trough of proper width at one end to allow a silent chain link to lie longitudinally flatwise therein but to prevent it from lying crosswise therein, so that the points of the link are necessarily toward one side or the other of the trough, and converging at an intermediate point toward the other end so that at such other end the width is merely sufficient to receive the links edgewise with sufficient clearance for sliding, and a medial longitudinal vertical partition located in said trough at its converging portion, said partition terminating toward the wide end of the trough in a narrow plow point formed by having its upper edge extend at an oblique angle to the bottom of the trough to the plane of the under surface of a link lying in the trough so that as a link slides along the trough said plow point projects under it along its longitudinal medial line and tilts one edge of the link upward to bring the link toward an upright position on the other side of said partition from that on which said edge originally lay, and said medial partition being lower than the side walls of the trough.

3. A positioning device for silent chain links, comprising a trough of proper width at one end to allow a silent chain link to lie longitudinally flatwise therein but to prevent it from lying crosswise therein, so that the points of the link are necessarily toward one side or the other of the trough, and converging at an intermediate point toward the other end so that at such other end the width is merely sufficient to receive the links edgewise with sufficient clearance for sliding, a medial longitudinal vertical partition located in said trough at its converging portion, said partition terminating toward the wide end of the trough in a narrow plow point formed by having its upper edge extend at an oblique angle to the bottom of the trough to the plane of the under surface of a link lying in the trough so that as a link slides along the trough said plow point projects under it along its longitudinal medial line and tilts one edge of the link upward to bring the link toward an upright position on the other side of said partition from that on which said edge originally lay, said medial partition being lower than the side walls of the trough, and the side walls of the trough being sufficiently close together at that end of the medial partition which is toward the narrow end of the trough so that the uptilted link edge is engaged by the side wall of the trough before the link passes out of engagement with said medial partition.

4. A positioning device for silent chain links, comprising a trough of proper width at one end to allow a silent chain link to lie longitudinally flatwise therein but to prevent it from lying crosswise therein, so that the points of the link are necessarily toward one side or the other of the trough, and converging at an intermediate point toward the other end so that at such other end the width is merely sufficient to receive the links edgewise with sufficient clearance for sliding, and a medial longitudinal vertical partition located in said trough at its converging portion, said partition terminating toward the wide end of the trough in a narrow plow point formed by having its upper edge extend at an oblique angle to the bottom of the trough to the plane of the under surface of a link lying in the trough so that as a link slides along the trough said plow point projects under it along its longitudinal medial line and tilts one edge of the link upward to bring the link toward an upright position on the other side of said partition from that on which said edge originally lay, the side walls of the trough at that end of the medial partition which is toward the narrow end of the trough being sufficiently close together so that they will engage the points and back of the tilted link with the link at a sufficient angle so that the continued convergence of the sides will bring the link substantially to a vertical position.

5. A positioning device for silent chain links, comprising a trough of proper width at one end to allow a silent chain link to lie longitudinally flatwise therein but to prevent it from lying crosswise therein, so that the points of the link are necessarily toward one side or the other of the trough, and converging at an intermediate point toward the other end so that at such other end the width is merely sufficient to receive the links edgewise with sufficient clearance for sliding, a medial longitudinal vertical partition located in said trough at its converging portion, said partition terminating toward the wide end of the trough in a narrow plow point formed by having its upper edge extend at an oblique angle to the bottom of the trough to the plane of the under surface of a link lying in the trough so that as a link slides along the trough said plow point projects under it along its longitudinal medial line and tilts one edge of the link upward to bring the link toward an upright position on the other side of said partition from that on which said edge originally lay, and said partition terminating toward the narrow end of the trough at an intermediate point along the converging portion so that the convergence continues beyond that end of said medial partition.

6. A positioning device for silent chain links, comprising a trough of proper width at one end to allow a silent chain link to lie longitudinally flatwise therein but to prevent it from lying crosswise therein, so that the points of the link are necessarily toward one side or the other of the trough, and converging at an intermediate point toward the other end so that at such other end the width is merely sufficient to receive the links edgewise with sufficient clearance for sliding, a medial longitudinal vertical partition located in said trough at its converging portion, said partition terminating toward the wide end of the trough in a narrow plow point formed by having its upper edge extend at an oblique angle to the bottom of the trough to the plane of the under surface of a link lying in the trough so that as a link slides along the trough said plow point projects under it along its longitudinal medial line and tilts one edge of the link upward to bring the link toward an upright position on the other side of said partition from that on which said edge originally lay, said partition terminating toward the narrow end of the trough at an intermediate point along the converging portion so that the convergence continues beyond that end of said medial partition, said medial partition being lower than the side walls of the trough.

7. A positioning device for silent chain links, comprising a trough of proper width at one end to allow a silent chain link to lie longitudinally flatwise therein but to prevent it from lying crosswise therein, so that the points of the link are necessarily toward one side or the other of the trough, and converging at an intermediate point toward the other end so that at such other end the width is merely sufficient to receive the links edgewise with sufficient clearance for sliding, a medial longitudinal vertical partition located in said trough at its converging portion, said partition terminating toward the wide end of the trough in a narrow plow point formed by having its upper edge extend at an oblique angle to the bottom of the trough to the plane of the under surface of a link lying in the trough so that as a link slides along the trough said plow point projects under it along its longitudinal medial line and tilts one edge of the link upward to bring the link toward an upright position on the other side of said partition from that on which said edge originally lay, said partition terminating toward the narrow end of the trough at an intermediate point along the converging portion so that the convergence continues beyond that end of said medial partition, and the side walls of the trough being sufficiently close together at that end of the medial partition which is toward the narrow end of the trough so that the up-tilted link edge is engaged by the side wall of the trough before the link passes out of engagement with said medial partition.

8. A link-positioning device, comprising a trough formed at one end to hold links flatwise in end-to-end relationship and at the other to hold the links edgewise in a single series in end-to-end relationship and tapering at an intermediate point to join such two end portions, and an intermediate longitudinal partition having an inclined edge.

9. A link-positioning device, comprising a trough formed at one end to hold links flatwise in end-to-end relationship and at the other to hold the links edgewise in a single series in end-to-end relationship and tapering at an intermediate point to join such two end portions, and an intermediate longitudinal partition having an inclined edge, said partition extending from a point on such wider end portion of the trough to a point on such intermediate portion but terminating short of such narrow end portion.

10. A link-positioning device, comprising a trough formed at one end to hold links flatwise in end-to-end relationship and at the other end to hold the links edgewise in a single series in end-to-end relationship, and an intermediate longitudinal partition having an inclined edge.

11. A positioning device for flat members which are unbalanced about their medial lines, comprising a trough, and an intermediate partition located centrally in said trough and having an inclined upper edge, said trough extending longitudinally beyond both ends of said partition and being of proper width at one end to receive such flat members flatwise with such medial lines extending longitudinally of the trough in the middle thereof and of proper width at the other end to receive such flat members edgewise.

12. A positioning device for flat members, comprising a trough, and an intermediate partition located in said trough and having an inclined upper edge, said trough extending longitudinally beyond both ends of said partition and being of proper width at one end to receive such flat members flatwise with their medial lines extending longitudinally of the trough in the middle thereof and of proper width at the other end to receive such flat members edgewise.

13. A link-positioning device, comprising a trough formed at one end to hold links flatwise in end-to-end relationship and at the other end to hold the links edgewise in a single series in end-to-end relationship, and an intermediate longitudinal partition having an inclined edge, the sides of the trough converging along such partition.

14. A positioning device for flat members which are unbalanced about their medial lines, comprising a trough, and an intermediate partition located centrally in said trough and having an inclined upper edge, said trough extending longitudinally beyond both ends of said partition and being of proper width at one end to receive such flat members flatwise with such medial lines extending longitudinally of the trough in the middle thereof and of proper width at the other end to receive such flat members edgewise, the sides of the trough converging along such partition.

In witness whereof, I have hereunto set my hand at Indianapolis, Indiana, this 21st day of April, A. D. one thousand nine hundred and sixteen.

OWEN H. SPENCER.